United States Patent
Nogaret et al.

(10) Patent No.: US 6,864,598 B2
(45) Date of Patent: Mar. 8, 2005

(54) METHOD OF AND A SYSTEM FOR CONTROLLING THE SUPPLY OF ELECTRICAL POWER TO AN ELECTRICALLY PROPELLED VEHICLE DESIGNED TO OPERATE IN AN EXTERNAL POWER SUPPLY MODE OR IN AN AUTONOMOUS POWER SUPPLY MODE

(75) Inventors: Philippe Nogaret, Salles-Adour (FR); Arnaud Deleu, Orleans (FR)

(73) Assignee: Alstom, Paris (FR)

( * ) Notice: Subject to any disclaimer, the term of this patent is extended or adjusted under 35 U.S.C. 154(b) by 454 days.

(21) Appl. No.: 10/092,595

(22) Filed: Mar. 8, 2002

(65) Prior Publication Data

US 2002/0139629 A1 Oct. 3, 2002

(30) Foreign Application Priority Data

Mar. 29, 2001 (FR) .............................. 01 04276

(51) Int. Cl.$^7$ .............................................. H02G 3/00
(52) U.S. Cl. ..................................... 307/10.1
(58) Field of Search ......................... 307/10.1

(56) References Cited

U.S. PATENT DOCUMENTS 3,924,084 A  12/1975  Lindfors .................. 191/45 R
4,853,553 A * 8/1989  Hosie ...................... 290/40 C
6,294,886 B1 * 9/2001  Gibard ..................... 318/161
6,646,360 B2 * 11/2003 Brown ...................... 307/43

FOREIGN PATENT DOCUMENTS

| DE | 23 38 222 A |   | 2/1975 |
| DE | 19628877 | * | 1/1998 |
| EP | 0 982 176 A |   | 3/2000 |
| WO | WO 00/37279 A |   | 6/2000 |

* cited by examiner

Primary Examiner—Pia Tibbits
(74) Attorney, Agent, or Firm—Sughrue Mion, PLLC

(57) ABSTRACT

A method is disclosed of controlling the supply of electrical power to an electrically propelled vehicle designed to operate in an external power supply mode or in an autonomous power supply mode. The vehicle includes an uninterrupted power supply bus connected both to an autonomous power supply system on board the vehicle and to an external power supply line which can be connected to an external power supply infrastructure by means of a connection member. Connection of the connection member to the external power supply infrastructure is detected by measuring the current flowing in the external power supply line. The presence of a non-zero current in the line indicates the presence of an external power supply infrastructure connected to the connection member.

8 Claims, 1 Drawing Sheet

METHOD OF AND A SYSTEM FOR CONTROLLING THE SUPPLY OF ELECTRICAL POWER TO AN ELECTRICALLY PROPELLED VEHICLE DESIGNED TO OPERATE IN AN EXTERNAL POWER SUPPLY MODE OR IN AN AUTONOMOUS POWER SUPPLY MODE

BACKGROUND OF THE INVENTION

1. Field of the Invention

The present invention relates to a method of and to a system for controlling the supply of electrical power to an electrically propelled vehicle designed to operate in an external power supply mode or in an autonomous power supply mode as a function of the presence or the absence of an external power supply infrastructure along the route of the vehicle. The invention relates in particular to supplying electrical power to trams.

2. Description of the Prior Art

Patent application FR-A1-2 782 680 discloses a system of supplying power to electrically propelled vehicles enabling operation of public transport vehicles, such as high-capacity trams, without using an uninterrupted power supply via overhead contact lines. The system includes an autonomous power supply system on board the vehicle, consisting of an electric motor with a heavy flywheel, and stops provided with an overhead contact line for recharging the autonomous power supply system via a pantograph carried by the vehicle.

The above power supply system has the drawback of necessitating detection of the connection of the pantograph to the overhead contact line to optimize management of the changeover from one power supply mode to the other and the performance of the power supply system. To optimize the performance of the vehicle, it is further necessary for the vehicle to be always supplied with electrical power by the autonomous power supply system or by the overhead contact line, which leads to transition phases during which the vehicle is connected both to the autonomous power supply system and to the overhead contact line. During these transition phases the autonomous power supply system is active, i.e. used as a power generator, with an output voltage greater than the overhead contact line voltage, which causes a loss of power from the autonomous power supply system to the overhead contact line, accompanied by fast and costly discharging of the autonomous power supply system. Another drawback of the above power supply system is the possibility of electrical arcing when the pantograph separates from the overhead contact line, causing rapid wear of these components.

The invention therefore aims to remedy the above drawbacks by proposing a method of and a system for controlling the supply of electrical power to an electrically propelled vehicle operating in an autonomous power supply mode or in an external power supply mode, which method and system are adapted to detect connection of the vehicle to an external power supply infrastructure and to optimize management of transition phases between the two power supply modes and are simple and economic to put into practice.

SUMMARY OF THE INVENTION

The invention provides a method of controlling the supply of electrical power to an electrically propelled vehicle designed to operate in an external power supply mode or in an autonomous power supply mode as a function of the presence or the absence of an external power supply infrastructure (7) along the route of the vehicle, which includes an uninterrupted power supply bus (1) connected both to an autonomous power supply system (6) on board the vehicle and to an external power supply line (2) that can be connected to an external power supply infrastructure (7) by means of a connection member (5), in which method connection of the connection member (5) to the external power supply infrastructure (7) is detected by measuring the current flowing in the external power supply line (2), the presence of a non-zero current in the external power supply line (2) indicating the presence of an external power supply infrastructure (7) connected to the connection member (5).

According to one feature of the method according to the invention, when the vehicle is in a transient power supply phase during which the uninterrupted power supply bus (1) is simultaneously supplied with energy by the autonomous power supply system (6) and connected to the external power supply infrastructure (7), the output voltage of the autonomous power supply system (6) is controlled so that the current flowing in the external power supply line (2) is substantially zero.

According to another feature of the method according to the invention, when the vehicle is moving and supplied with power by the autonomous power supply system (6) only and reaches an area equipped with an external power supply infrastructure (7), the following steps are carried out:

detecting connection of the connection member (5) to the external power supply infrastructure by the appearance of a non-zero current in the power supply line;

controlling the output voltage of the autonomous power supply system (6) so that the current flowing in the external power supply line (2) is substantially canceled; and stopping the supply of power by the autonomous power supply system (6) to the uninterrupted power supply bus (1).

According to a further feature of the method according to the invention, when the vehicle is moving and is supplied with power only by the external power supply line (2) and reaches an area that is not equipped with an external power supply infrastructure (7), before disconnecting the connection member from the external power supply infrastructure, the following steps are carried out:

starting the autonomous power supply system (6) so that it supplies power to the uninterrupted power supply bus (1); and controlling the output voltage of the autonomous power supply system (6) so that the current in the external power supply line (2) is substantially canceled.

The invention also provides a system for controlling the supply of electrical power to an electrically propelled vehicle designed to operate in an autonomous power supply mode or in an external power supply mode as a function of the presence or absence of an external power supply infrastructure (7) along the route of the vehicle, which includes an uninterrupted power supply bus (1) connected both to an autonomous power supply system (6) on board the vehicle and to an external power supply line (2) that can be connected to an external power supply infrastructure (7) by means of a connection member (5), which system includes a current sensor (13) for measuring the current flowing in the external power supply line (2) in order to detect connection of the connection member (5) to the external power supply structure (7).

Particular embodiments of the system for controlling the supply of electrical power to a vehicle can include one or more of the following features, individually or in any technically feasible combination:

the autonomous power supply system (6) includes a control module (12) for modifying the output voltage of the autonomous power supply system (6);

the autonomous power supply system (6) is a system including a flywheel for accumulating kinetic energy; and the connection member (5) is a pantograph carried by the vehicle and adapted to cooperate with an external power supply infrastructure consisting of an overhead contact line (7).

Objects, aspects and advantages of the present invention will be better understood from the following description of one embodiment of the invention, which description is given by way of example only and with reference to the accompanying drawing.

DETAILED DESCRIPTION OF THE PREFERRED EMBODIMENT

Figure 1:
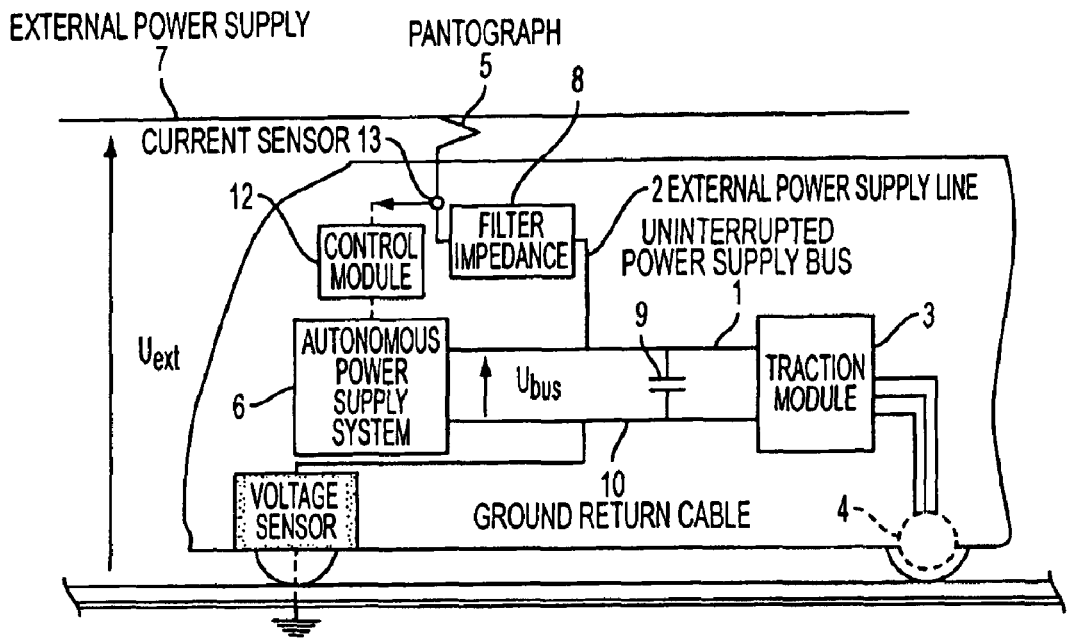
FIG. 1 is a diagram of the electrical power supply arrangements of a tram equipped with a control system according to the invention.

FIG. 1 is a diagram of the electrical power supply arrangements of a tram running on rails and equipped with electrical traction motors 4 that are reversible, i.e. which absorb electrical energy in traction and supply electrical energy during braking.

The traction motors are controlled by a traction module 3 connected to an uninterrupted power supply bus 1 supplied with power under conventional conditions via an external power supply line 2 and under autonomous conditions by an autonomous power supply system 6 on board the tram. The traction motors 4 are three-phase motors, for example, although this is not limiting on the invention, in which case the traction module 3 is an inverter. The traction module 3 is connected to a cable 10 providing the return path to ground for the current by conduction via the wheels of the tram and the rails of the track.

The external power supply line 2 terminates at a pantograph 5 on the roof of the tram and is designed to cooperate with an overhead contact line 7 when the tram is traveling on a portion of the track equipped with the above kind of infrastructure. The external power supply line 2 has a filter impedance 8 between the pantograph 5 and the uninterrupted power supply bus 1 and a capacitor 9 connected between the uninterrupted bus 1 and the ground return cable 10.

The autonomous power supply system 6 is a system for accumulating kinetic energy including a synchronous permanent magnet electric motor whose rotor drives a flywheel, the motor being associated with a converter or an accumulator with a two-quadrant chopper for controlling the output voltage of the autonomous power supply system. During charging the flywheel is driven by the motor at a high speed and during discharging the motor functions as a generator and supplies power to the traction module 3.

The output voltage of the autonomous power supply system 6 is controlled by a control module 12 which receives information from a current sensor 13 on the external power supply line 2. The control module 12 regulates the output voltage within a range of voltages close to the range of voltages on the overhead contact line (typically 750 V), to enable identical operation of the traction module 3 whether it is supplied with power directly by the autonomous power supply system 6 or via the overhead contact line 7.

The method of controlling the supply of power to the tram is described next.

When the tram is traveling on a portion of track that is not equipped with a overhead contact line 7, the traction module of the tram is supplied with power exclusively by the autonomous power supply system 6, which is then in an active mode, i.e. operating as a power generator, with the pantograph 5 lowered at the command of the driver, for example. During this phase, the pantograph 5 is not connected to an overhead contact line and no current flows in the external power supply line 2 of the tram. The control module 12 then receives from the sensor 13 the information that the current $I_{ext}$ in the external line 2 is zero and regulates the output voltage to a nominal value of the order of 750 V.

When the tram reaches an area equipped with an overhead contact line 7, the driver commands the deployment of the pantograph 5 so that the latter comes into contact with the overhead contact line 7. During this phase the autonomous power supply system 6 is still in the active mode and the control module 12 of the autonomous power supply system 6, which receives and analyzes continuously the value of the current flowing through the current sensor 13, detects the moment at which the current $I_{ext}$ becomes non-zero, substantially corresponding to the moment at which the pantograph 5 is connected to the overhead contact line 7.

Figure 2:
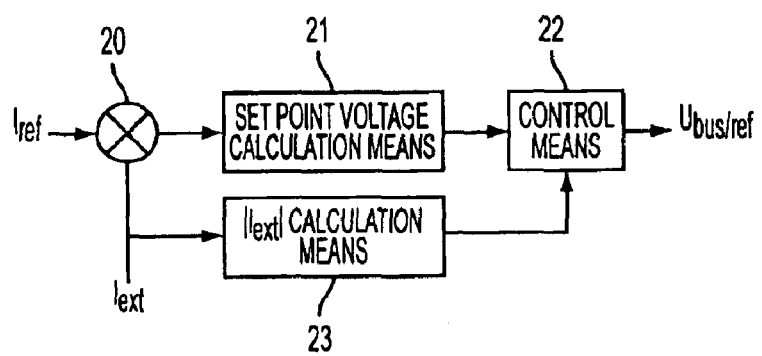
FIG. 2 is a diagram showing regulation of current in an external power supply line by a control method in accordance with the invention when the uninterrupted power supply bus of the tram is simultaneously supplied with power by the autonomous power supply system and by the overhead contact line.

From this moment at which a non-zero current $I_{ext}$ is detected by the sensor 13, the autonomous power supply system 6 being still in the active mode, the control module 12 controls the output voltage of the autonomous power supply system 6 in such a manner as to regulate the current $I_{ext}$ flowing in the external power supply line 2 to a value close to zero. This regulation of the current $I_{ext}$ can be effected by a computer, for example, in accordance with the FIG. 2 control diagram in which the value of the current $I_{ext}$ from the sensor 13 is fed into first and second branches. The first branch includes a comparator 20 for calculating the difference between a reference current $I_{ref}$ chosen to be zero and the measured value of the current $I_{ext}$. The output of the comparator 20 is fed to a block 21 which calculates a set point voltage $U_{bus/ref}$ close to the overhead contact line voltage in order substantially to cancel out the current $I_{ext}$, the overhead contact line voltage being measured by means of a sensor in order to preset the voltage $U_{bus/ref}$ to a value around the overhead contact line voltage; the sensor transmits the set point voltage $U_{bus/ref}$ to a control unit 22. As shown in FIG. 2, the second branch includes a block 23 for calculating the absolute value of the current $I_{ext}$ and comparing that value to a threshold close to zero, for example chosen to be equal to 50 mA. The information that the absolute value of the current $I_{ext}$ is above the threshold is then sent to an input of the control unit 22 which blocks sending of the new set point voltage $U_{bus/ref}$ as long as the current $I_{ext}$ is below the current threshold.

This regulation of the output voltage of the autonomous power supply system 6 when the uninterrupted power supply bus 1 is simultaneously supplied with power by the overhead contact line 7 and by the autonomous power supply system 6 in the active mode prevents the autonomous power supply system 6 from being discharged through the overhead contact line 7 if the overhead contact line voltage is less than the output voltage of the autonomous power supply system 6.

Following detection of connection of the pantograph 5 to the overhead contact line 7, the autonomous power supply system 6 is placed in a passive mode, either automatically by means of a time delay, or manually at the command of the driver. When the autonomous power supply system 6 is in the passive mode, i.e. is no longer supplying power to the uninterrupted power supply bus 1, the traction module 3 is supplied with power exclusively by the overhead contact line 7 via the external power supply line 2, and the autonomous power supply system 6 also receives current from the external power supply line 2 for topping up the kinetic energy of the flywheel, in particular when the tram is stationary at a stop, or during braking, when all of the power available via the overhead contact line can be used to charge the autonomous power supply system 6.

When the tram is preparing to leave the area equipped with the overhead contact line 7 and enter an area that is not so equipped, the autonomous power supply system 6 is switched to the active mode again, either at the command of the driver or automatically, for example through interaction with a beacon disposed along the route, or by a computer estimating its position. During this phase the uninterrupted power supply bus 1 is supplied with power simultaneously by the autonomous power supply system 6 and the external power supply line 2 and the control module 12 then regulates the output voltage of the autonomous power supply system 6 so that the current $I_{ext}$ flowing in the external power supply line is substantially canceled, thereby avoiding discharging of the autonomous power supply system 6 via the overhead contact line 7.

The pantograph 5 can then be disconnected from the overhead contact line 7, either naturally on reaching the end of the overhead contact line 7 or at the command of the driver, in which case disconnection is effected with no risk of electrical arcing because the current is substantially zero in the external power supply line 2 because of the regulation effected by the control module 12.

The tram power supply control system and method according to the invention therefore provide a very simple way to detect the moment at which the pantograph is connected to the overhead contact line and therefore to optimize charging of the autonomous power supply system by preventing any fast discharging of the autonomous power supply system via the overhead contact line. What is more, the method according to the invention eliminates all risk of electrical arcing on disconnecting the pantograph, which considerably increases the service life of the components.

Of course, the invention is in no way limited to the embodiment described and shown, which is offered by way of example only and is open to modifications, in particular from the point of view of the composition of the various components or through substituting technical equivalents, without this departing from the scope of protection of the invention.

Thus, in an embodiment that is not shown, the connection member could be a shoe cooperating with an external power supply infrastructure in the form of a rail.

What is claimed is:

1. A method of controlling the supply of electrical power to an electrically propelled vehicle designed to operate in an external power supply mode or in an autonomous power supply mode as a function of the presence or the absence of the external power supply infrastructure along the route of said vehicle, which includes an uninterrupted power supply bus connected both to an autonomous power supply system on board said vehicle and to an external power supply line that can be connected to an external power supply infrastructure by means of a connection member, in which method connection of said connection member to said external power supply infrastructure is detected by measuring the current flowing in said external power supply line, the presence of a non-zero current in said line indicating the presence of an external power supply infrastructure connected to said connection member.

2. The method claimed in claim 1 of controlling the supply of electrical power to a vehicle, wherein, when said vehicle is in a transient power supply phase during which said uninterrupted power supply bus is simultaneously supplied with energy by said autonomous power supply system and connected to said external power supply infrastructure, the output voltage of said autonomous power supply system is controlled so that the current flowing in said external power supply line is substantially zero.

3. The method claimed in claim 2 of controlling the supply of electrical power to a vehicle, wherein, when said vehicle is moving and supplied with power by said autonomous power supply system only and reaches an area equipped with an external power supply infrastructure, the following steps are carried out:
   detecting connection of said connection member to said external power supply infrastructure by the appearance of a non-zero current in said power supply line;
   controlling the output voltage of said autonomous power supply system so that the current flowing in said external power supply line is substantially canceled; and
   stopping the supply of power by said autonomous power supply system to said uninterrupted power supply bus.

4. The method claimed in claim 2 of controlling the supply of electrical power to a vehicle, wherein, when said vehicle is moving and is supplied with power only by said external power supply line and reaches an area that is not equipped with an external power supply infrastructure, before disconnecting said connection member from said external power supply infrastructure, the following steps are carried out
   starting said autonomous power supply system so that it supplies power to said uninterrupted power supply bus; and
   controlling the output voltage of said autonomous power supply system so that the current in said external power supply line is substantially canceled.

5. A system for controlling the supply of electrical power to an electrically propelled vehicle designed to operate in an autonomous power supply mode or in an external power supply mode as a function of the presence or absence of the external power supply infrastructure along the route of said vehicle, which includes an uninterrupted power supply bus connected both to an autonomous power supply system on board said vehicle and to an external power supply line that can be connected to an external power supply infrastructure by means of a connection member, which system includes a current sensor for measuring the current flowing in said external power supply line in order to detect connection of said connection member to said external power supply structure.

6. The system claimed in claim 5 for controlling the supply of electrical power to a vehicle, wherein said autonomous power supply system includes a control module for modifying the output voltage of said autonomous power supply system.

7. The system claimed in claim 6 for controlling the supply of electrical power to a vehicle, wherein said autonomous power supply system is a system including a flywheel for accumulating kinetic energy.

8. The system claimed in claim 5 for controlling the supply of electrical power to a vehicle, wherein said connection member is a pantograph carried by said vehicle and adapted to cooperate with an external power supply infrastructure consisting of a overhead contact line.

* * * * *